Sept. 5, 1944.  O. S. PETTY  2,357,356
MEASURING INSTRUMENT AND METHOD
Filed Nov. 20, 1940  3 Sheets-Sheet 1
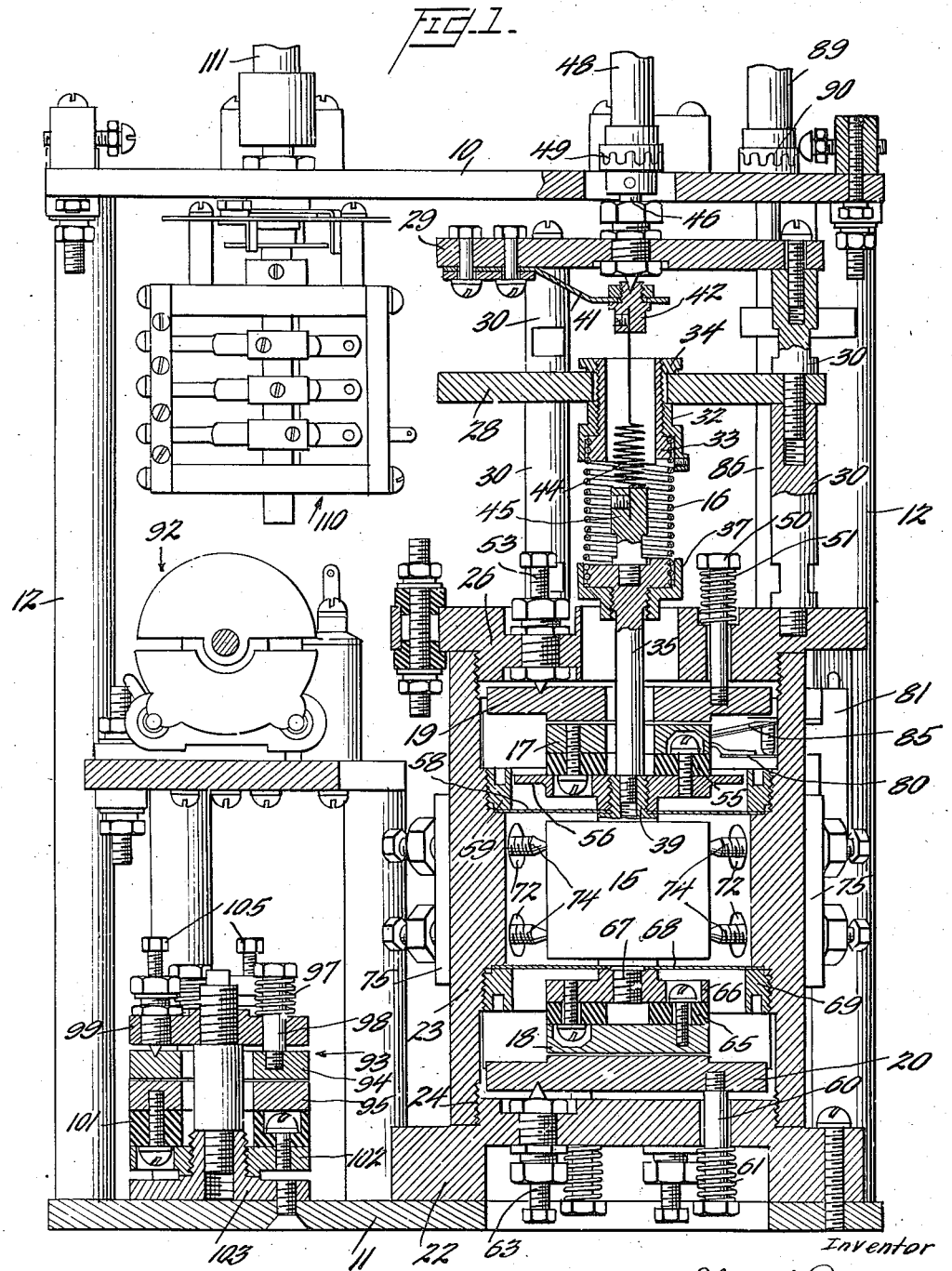
Inventor
Olive S. Petty
By Watson, Cole, Grindle & Watson
Attorney

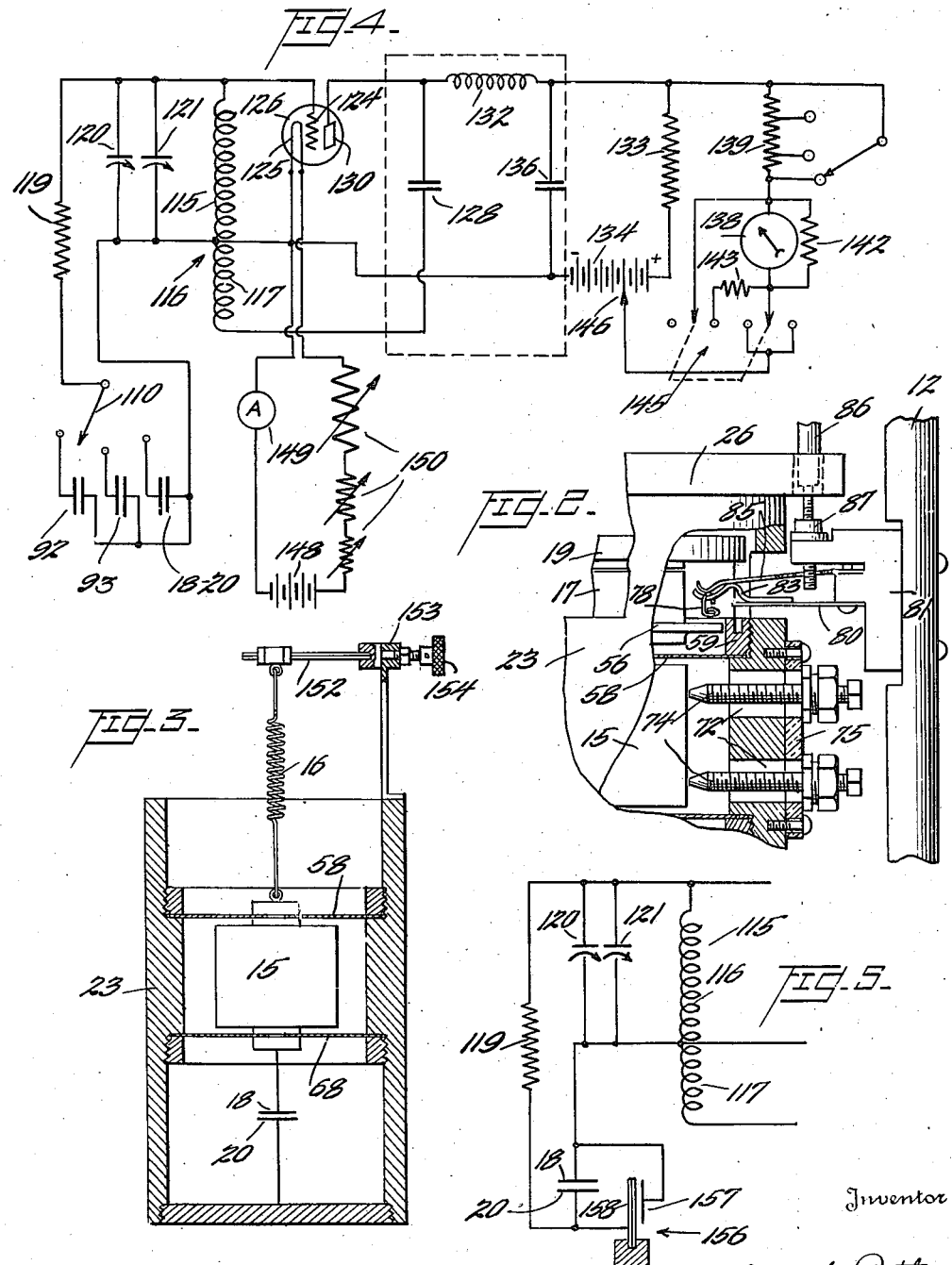

Sept. 5, 1944.  O. S. PETTY  2,357,356
MEASURING INSTRUMENT AND METHOD
Filed Nov. 20, 1940  3 Sheets-Sheet 3
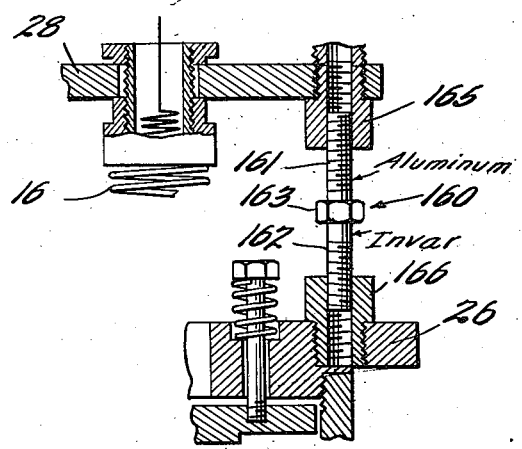
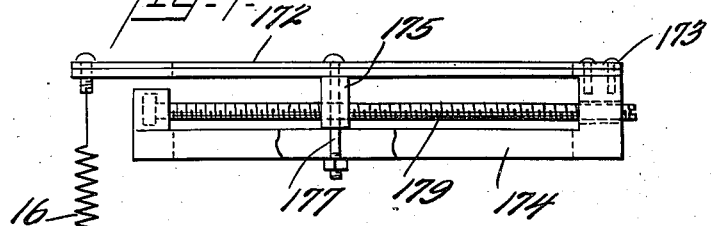
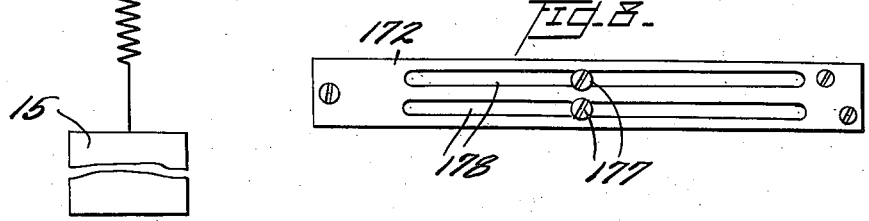
Inventor
Olive S. Petty
By Watson, Cole, Grindle & Watson
Attorney Patented Sept. 5, 1944

2,357,356

UNITED STATES PATENT OFFICE 2,357,356

MEASURING INSTRUMENT AND METHOD

Olive S. Petty, San Antonio, Tex.

Application November 20, 1940, Serial No. 366,495

10 Claims. (Cl. 265—1.4)

This invention relates primarily to methods and apparatus for use in gravimetric exploration and has for its principal object the provision of simplified equipment by means of which readings representative of variation in gravitational force from place to place may be obtained more readily and with greater accuracy.

It is well recognized that the gravitational pull at different points on the earth's surface is determined essentially by three major factors, namely the earth's configuration, the axial rotation, and the elevation. The magnitude of the effect due to each of these factors can be computed for any given point from the physical dimensions and measurement of the earth. However, there are certain minor reasons for variations in gravity which affect local areas only and cannot be calculated. Among these are variations in density, depth, and distribution and thickness of relatively shallow formations in the earth's outer crust, considerably above the depth where isostatic compensation is believed to be complete. It is these minor and purely local variations which are of primary interest in geophysical exploration with the gravity meter, because they often give important clues regarding anticlines, synclines, salt domes, faults, and other geological structures such as may be favorable to the accumulation of oil and gas.

The detection of these minor variations in gravity by means of the gravity meter requires the use of instruments of extreme sensitivity. Thus, for acceptable results, the difference in gravity recorded between different points must be measured to an accuracy of at least one part in ten million.

In its simplest form, the usual gravity meter comprises a mass suspended by a spring in a frame, means being provided to measure or record the vertical displacement of the mass with respect to the frame. As the meter is moved from one station to another, the variations in gravity cause changes in the spring tension by virtue of the attractive force on the mass, causing it to assume at each station a position of equilibrium between the two opposing forces.

One of the difficulties in the use of a device of this sort is the result of unpredictable variations in temperature, fluctuations in barometric pressure, and drift of the spring suspension. Thus it is important that the instrument be placed in a well insulated casing, and that the temperature within the casing be maintained as nearly constant as possible. Preferably the casing is sealed to avoid the effects of variation in barometric pressure; if not, the variation at each step is noted by reading a barometer and corrections are accordingly made to compensate for the difference in buoyant force acting upon the suspended mass. Again, by repeating the readings on a given station at recorded time intervals, correction may be made for the drift of the spring suspension.

However, it is found in practice that slight variation of temperature within the instrument casing is inevitable, even though excessive caution is exercised, the variation being of such magnitude that it cannot be ignored. It is therefore a more specific object of the instant invention to provide novel means for minimizing any error in readings resulting from temperature changes. It is a further object of the invention to provide a method of taking gravity readings which permits the elimination of any error due to temperature variation.

A further object of the invention is to provide an improved electrical circuit for association with a measuring instrument, such as a gravity meter, for measuring and/or recording with extreme accuracy the extent of displacement of a movably supported member. These and many other features of the invention, while particularly applicable to gravimetric work, are not necessarily limited thereto and are useful in many other fields.

Still a further object of the invention is the provision in a gravity meter of novel means for suspending the movable mass affording extreme delicacy of adjustment, yet insuring that the instrument will be sufficiently sturdy to withstand ordinary handling.

Further features and objects of the invention will be apparent from the following description taken in connection with the accompanying drawings, in which Figure 1 is a vertical sectional view through a gravity meter embodying the principles of the invention;

Figure 2 is a fragmentary vertical sectional view of the structure shown in Figure 1;

Figure 3 is a diagrammatic view illustrating a modified form of the invention;

Figure 4 is a wiring diagram of a circuit which may be associated with the apparatus illustrated herein;

Figure 5 is a diagram of a portion of the circuit shown in Figure 4 illustrating a further modification;

Figure 6 is a fragmentary sectional view corresponding to a portion of Figure 1 and illustrating a modification thereof;

Figure 7 is a diagrammatic view illustrating still a further modified form; and

Figure 8 is a view in plan of one of the elements shown in Figure 7.

In order to facilitate an understanding of the invention, reference will be made to the several embodiments thereof illustrated in the accompanying drawings and specific language will be employed. It will nevertheless be understood that various further modifications of the devices illustrated herein, such as would fall within the province of those skilled in the art, are contemplated as part of the present invention.

For example, while the invention is illustrated in its application to a gravity meter and is especially suited for such use, it will be recognized that, as hereinbefore mentioned, various features of novelty have wider fields of application, or may be employed in the taking of gravity measurements with instruments of a type other than that specifically disclosed herein.

Referring now to Figure 1 of the drawings, representing a vertical section through certain elements of a gravity meter embodying the principles of the invention, it will be noted that in order to simplify the illustration the usual insulating casing with its heat control means, and various other elements ordinarily introduced in the casing, such for example as the electrical apparatus employed for displacement measurement, have been omitted. The figure thus illustrates only one unit of the equipment which is supported in a frame comprising upper and lower plates 10 and 11, these plates being maintained in rigid spaced relation by rods 12. The elements of primary interest are the movable mass 15, the main supporting spring 16 for the movable mass, the upper and lower movable plates 17 and 18, which are secured to and movable with the mass 15, and the cooperating, normally stationary upper and lower fixed plates 19 and 20. Thus on displacement of the mass 15 in a vertical direction, due to variation in gravitational force, the plates 17 and 19 and the plates 18 and 20, which are only slightly spaced, will be subjected to a corresponding relative displacement, and the displacement of either pair of plates may be measured to afford an indication of the gravitational pull, the other pair of plates serving to damp the movement of the elastic system constituted by the spring 16, the mass 15, and associated parts, whereby the mass may promptly be brought to a state of rest for accurate measurement of its position in the frame, and to limit motion in an axial direction. In the preferred form of the invention the displacement of the movable mass is measured by means of the corresponding variation in electrical capacity between the plates in one pair, as described in connection with the circuit diagram shown in Figure 5. The detailed structure shown in Figure 1 will now be more particularly described.

Mounted on the frame plate 11 is a base 22; a generally cylindrical member 23 is received on the base, the member and base having cooperating threads as indicated at 24. Threaded within the upper end of the member 23 is a disc 26. Mounted on the disc 26 and arranged in superposed and spaced relation are the discs 28 and 29, supporting and spacing rods 30 extending between and being secured to the several discs. The elements just described constitute the structure affording the direct support for the operating parts of the meter.

Thus the main supporting spring 16 for the mass 15 is secured at its upper end to the disc 28 by means of cooperating threaded bushings 32 and 33, between which the upper convolutions of the spring are retained. The bushing 33 receives a threaded nut 34, and the disc 28 is clamped between this nut and the bushing 32. The lower end of the spring 16 is similarly clamped on the upper end of a spindle 35 by means of a member 37 having threaded engagement with the spindle, the lower convolutions of the spring being retained in position by cooperating flanges on the spindle 35 and member 37. The spindle 35 is threaded at its lower end for reception in a boss 39 formed on the mass 15, whereby the mass is elastically supported by the spring 16.

A flat spring 41 secured to disc 29 carries an element 42 in which is secured one end of a relatively light coil spring 44, the lower end of spring 44 being secured to an element 45 which is threaded at the upper end of the spindle 35. The element 42 is engaged at its upper end by an element 46 having threaded engagement with the disc 29, the element 46 being rotated by means of an operating shaft 48 which is connected to the element 46 through coupling 49. Rotation of the operating shaft 48 depresses or elevates the element 46, and accordingly the element 42, so as to adjust the tension on the spring 44, and thereby to adjust the total spring force by which the mass 15 is suspended. It is thus possible to regulate accurately the initial position of the mass 15 and thereby the spacing between the two pairs of plates 17, 19 and 18, 20.

The plates 19 and 20 are further supported for individual adjustment in a vertical direction. Thus plate 19 is supported by a plurality of coil springs 51 surrounding bolts 50 which are threaded into plate 19, the lower ends of the springs bearing on disc 26. The supporting springs 51 are angularly spaced at equal intervals about the disc 26, and intermediate the adjacent supporting springs are disposed a plurality of bolts 53 which extend through and have threaded engagement with the disc 26, and which bear at their lower ends on plate 19. Thus by adjustment of bolts 53, plate 19 may be positioned in the proper horizontal plane and may be displaced bodily in a vertical direction to establish the same in correct spaced relation to the cooperating movable plate 17. Plate 17 is secured to an insulating plate 55 which is in turn secured to a plate 56 having threaded relation with the boss 39 on mass 15. A spring diaphragm 58, which may be in the form of a spiral when viewed in plan, is secured at its periphery to the cylindrical member 23 by a threaded annulus 59, and is gripped adjacent its central portion by cooperating shoulders on boss 39 and plate 56.

A similar arrangement may be provided for vertical adjustment of the plate 20, the latter being supported by a plurality of coil springs 61 surrounding bolts 60 which are threaded into plate 20, the springs bearing at their upper ends on base 22. Intermediate the springs 61 are disposed a plurality of bolts 63 which extend through and have threaded engagement with the base 22 and which bear at their upper ends on plate 20. Thus by adjustment of bolts 63, plate 20 may be properly positioned and vertically adjusted to establish the same in correct spaced relation to the cooperating movable plate 18. Plate 18 is secured to an insulating plate 65 which is in turn secured to a plate 66 having threaded relation with a boss 67 at the lower side of mass 15. A spring diaphragm 68 is secured at its periphery to the cylindrical member 23 by a threaded annulus 69, and is gripped adjacent its central portion by cooperating shoulders on boss 67 and plate 66.

Extending with ample clearance through apertures 72 in member 23 are a plurality of bolts 74 which are threaded for adjustable reception in insulating strips 75 secured to the exterior surface of member 23. Bolts 74 may be adjusted so that their inner ends extend in close proximity to the periphery of mass 15, and may thus serve as bumpers to prevent damage to the instrument by lateral swinging of the mass during handling. In practice, an electrical circuit is completed when any of the bolts 74, which are insulated from the frame, contact with the mass 15, and suitable indicating or signal means are associated with the circuit. Thus the bolts may first be adjusted into contact with the mass and may then be withdrawn very slightly so as to afford only a very small clearance for the mass. It is thereby possible to prevent any substantial lateral displacement of the mass, and at the same time to insure that during the taking of a measurement the mass is free from contact with the bolts 74.

In this connection, it may be pointed out that methods of stabilizing instruments of this character in transport which involve clamping of the spring and mass to positively prevent motion thereof are not wholly satisfactory, it being difficult to avoid asymmetry and the setting up of resulting stresses in the moving system. In accordance with the present invention, the movable mass is not locked in transit; lateral displacement is limited as just described while vertical displacement is limited by the small clearance between the two pairs of plates 17, 19 and 18, 20.

Means are provided to determine the sensitivity of the meter by adding to the mass 15 a small weight 78 of known mass, whereby the effect of the small weight on the readings may be observed. The preferred arrangement is shown in Figure 1, but is illustrated in more detail in Figure 2. Thus a flat spring 80 is secured to an element 81 which is supported by and adjustable vertically on rod 12. An element 83 having a hooked portion for reception of the weight 78 is secured to the spring 80. A second flat spring 85 is secured to the element 81 and yieldingly engages the hooked portion of the element 83 to prevent unintentional displacement of the weight 78. A control rod 86 having the lower end thereof threaded for reception in a nut 87 carried on element 81 extends upwardly through the top plate 10 of the structure and is connected to an operating shaft 89 by means of a coupling 90. Thus when the rod 86 is rotated by the operating shaft 89, the lower end of the rod engages and depresses the flat spring 80 until the weight 78 rests on the plate 56 which is carried by the mass 15, the hooked element 83 moving away from the spring 85 so that the weight 78 is freely supported by the mass 15. Rotation of the control rod 86 in the opposite direction withdraws the weight 78 into the position shown in Figure 2 in which it is gripped by the spring 85. Initial adjustment may be effected by raising or lowering element 81 on rod 12.

Preferably the weight 78 is formed by bending a small diameter wire so as to provide a supporting hook portion, defining a generally vertical plane, and a curved base portion, defining a generally horizontal plane. This affords an extremely small mass and at the same time provides ample stability for the weight while resting on the plate 56.

Mounted in the main frame shown in Figure 1 are two condensers indicated generally at 92 and 93. Condenser 92 is of the variable, rotatable blade type, and may be initially adjusted as to capacity by any conventional operating mechanism, omitted from the drawing for convenience. This condenser is so designated as to be substantially unaffected by the slight temperature variation to which the instrument is ordinarily subjected, and is of course unaffected by gravity.

The capacity of condenser 93 is unaffected by gravity, but is affected by temperature. The condenser is constituted by plates 94 and 95 which are mounted for relative adjustment much in the same manner as the cooperating plates 17, 19. Thus plate 94 is supported on a plurality of coil springs 97 by means of bolts 98, the springs bearing on a plate 99 which is rigidly supported on the main frame. Plate 95 is secured to an insulating plate 101 which is in turn secured to a plate 102. Plate 102 has threaded connection with plate 103 which is secured on the bottom plate 11 of the frame.

The spacing of the plates 94 and 95 can be adjusted by the manipulation of bolts 105, threaded in plate 99 and bearing on plate 94. Plates 94, 95 and the associated elements may be so dimensioned that the capacity of condenser 93 varies with the temperature at the same rate as the capacity of plates 17, 19 or 18, 20, although this is not essential to the use of condenser 93 for the purpose of calibration, as hereinafter explained.

A switch indicated generally at 110 is also supported in the main frame shown in Figure 1, and is rotated by means of an operating shaft 111 extending through the top plate 10 of the main frame. This switch may be of the single pole type having three positions for the selective closing of any one of three circuits, whereby either the condenser 92, the condenser 93, or the condenser afforded by one pair of plates 17, 19 or 18, 20, associated with the mass 15, may be coupled into the main oscillating circuit from which readings are taken.

This circuit is shown more particularly in Figure 4 of the drawings, from which it will be observed that manipulation of switch 110 serves to place in shunt with one section 115 of an intermediate tapped inductance coil 116 any one of the three condensers 92, 93, or 18, 20, the impedance of the circuit including the section 115 of the winding being initially adjusted by means of a variable condenser 120 and trimmer condenser 121. A resistance 119 is preferably arranged in series with the selected condenser. The ends of section 115 of the coil are connected respectively to the grid 124 and cathode 125 of a thermionic valve 126. The remote end of section 117 of the coil is connected through a condenser 128 to the anode 130 of the valve 126.

The direct current path in the anode circuit of the valve includes the choke coil 132, the resistance 133, and the source 134 of anode voltage, the negative terminal of the latter being returned to the cathode 125. A condenser 136 is shunted across the resistance 133 and voltage source 134, the condensers 128 and 136, and the choke coil 132, constituting a filter for oscillating energy.

A galvanometer 138 is associated with the circuit so as to measure any change in voltage drop across the resistance 133 and thereby to measure any change in the direct current flowing in the anode circuit. A series tapped resistance 139 and shunt resistances 142 and 143 are associated with the galvanometer 138 for the purpose of altering the range of displacement and sensitivity thereof. A switch, indicated generally at 145, is employed for including or excluding resistance 143 from the galvanometer circuit. The galvanometer circuit, including the instrument and the several resistances, is connected to one end of resistance 133 and is returned to an adjustable tap 146 on anode voltage source 134. By adjustment of tap 146, the voltage supplied to the galvanometer circuit by the source 134 may be adjusted to give a null reading, this voltage opposing the voltage developed by anode current flow through resistance 133. Thus positive or negative readings may be derived from the galvanometer depending on the effect of gravity as compared with that of a convenient reference point.

The circuit just described is adjusted by a proper selection of constants to oscillate at a suitable frequency, and the frequency will vary with variation in the capacity of that one of the condensers 92, 93 and 19, 20, which is included in the circuit. Variation of the frequency alters the impedance of the oscillating circuit and thereby the anode current which is measured by the galvanometer as more fully described in my prior application, Serial No. 324,013, filed March 14, 1940, which illustrates a generally similar circuit as applied to the measurement of seismic impulses by a capacitive seismometer.

The cathode is heated from a supply source 148, an ammeter 149 and variable resistances 150, affording fine adjustment of the voltage applied to the filament, being included in the circuit. This arrangement permits delicate control of the emission of valve 126, and the emission is maintained at an optimum value.

Thus one method of ascertaining and computing to compensate for variation in temperature to which the instrument is subjected is substantially as follows. The switch 110 is first operated to include in the circuit condenser 92, which is not affected either by temperature or gravity. The resistances 150 are suitably adjusted and trimmer condenser 121 is set so as to bring the galvanometer to a reference point, for example a zero reading. Switch 110 is then manipulated to place the condenser 93 in the circuit, and since this condenser is affected by temperature variation, the reading thus obtained, without further adjustment of the circuit, will be representative of the temperature prevailing in the instrument casing. The switch 110 is again operated to place in the circuit the condenser 19, 20, which is responsive both to gravity and to temperature variation, and a further reading is taken. Similar readings are then taken in succession at varying temperatures which may be obtained by initially raising the temperature slightly above the normal and permitting it gradually to fall to a point below normal, the temperatures being noted. Each time a reading is taken with the condenser 92 included in the circuit, the cathode heating current is adjusted to bring the galvanometer to the predetermined reference point, so as to eliminate error resulting from slight fluctuations in the various constants of the circuit. After a series of such readings have been taken at a base point, readings in the field with the gravity responsive condenser 19, 20 and with the temperature responsive condenser 93 afford an indication of the extent of correction required to compensate for the extremely slight variation in temperature which is inevitable.

To view the matter in another way, the condenser 93 functions to indicate accurately the prevailing temperature within the casing, provided fluctuations of circuit constants are eliminated at the time of taking each reading by proper adjustment of the cathode heating current with the condenser 92 in the circuit.

In case it is desired to avoid computation to correct for temperature, the several condensers can be selectively included in the circuit at the time of taking each reading for the purpose of determining whether any significant variation in temperature within the casing has occurred. If no such variation is apparent, the readings can be assumed to be substantially correct; if substantial variation has occurred, the temperature can be adjusted and proper readings taken.

Figures 3 and 5 illustrate modified arrangements whereby automatic compensation for temperature variation may be obtained, it being contemplated that arrangements of the nature of those shown may be used in conjunction with a circuit such as that shown in Figure 4, either with or without the additional control of readings accomplished by the selection of different condensers as hereinbefore explained.

Thus Figure 3 illustrates a mechanical device affording temperature compensation, the essential elements of the gravity meter being illustrated generally, the same reference numerals being employed to designate similarly functioning parts in Figure 1. Thus the mass 15 is supported in a casing 23 against lateral swinging movement by means of diaphragm 58, the condenser actuated by the mass being shown conventionally at 19, 20. The supporting coil spring 16 is connected at its lower end to the mass 15 and at its upper end to a thermally responsive device 152, preferably in the form of a bi-metallic strip, the connection preferably being such as to permit free rotation of the rod 152 about a horizontal axis. The strip 152 is supported in a rotatable bushing 153 which is mounted in the frame in any suitable manner for rotation about a substantially horizontal axis. Operating means, for example a knurled head 154, permits adjustment of the position of the bushing 153.

It will be appreciated that metals of which the bimetallic strip 152 is formed must be so chosen that the direction of flexure of the strip on variation of temperature is such as to oppose the corresponding displacement of the mass 15 as the result of expansion or retraction of the mass and the elements associated therewith, and the dimensions of the strip are so chosen that the extent of compensation is reasonably accurate. In order to obtain greater accuracy of compensation the strip may be rotated about its horizontal supporting axis so that only a selected component of the flexure of the strip is applied to axial displacement of the point of support of the spring 16. It will be further appreciated that this adjustment may readily be made in the field and that the need for adjustment of the extent of compensation can readily be determined in the field if the device is employed in conjunction with the selective condenser system hereinbefore described.

Figure 5 illustrates an alternative arrangement for temperature compensation, this figure illustrating a portion of the circuit shown in Figure 4, similar reference numerals being employed to designate similar parts. Thus a trimmer condenser, indicated generally at 156 is arranged in shunt with the gravity responsive condenser 18, 20. This trimmer condenser may comprise cooperating plates 157 and 158, the latter being constituted by a thermally responsive device such as a bi-metallic strip suitably supported at one end. By proper selection of the materials of which the strip is formed, and proper dimensioning of the condenser plates and the spacing therebetween, the capacity of the trimmer may be caused to vary in opposition to the capacity of the main condenser 18, 20 on the occurrence of temperature change.

It will be appreciated that the mass 15 may either itself serve as one plate of a condenser or may be so connected to a condenser as to vary the plate spacing, in the manner herein shown. It will also be understood that the method and apparatus hereinbefore described are capable of use in various fields where extreme sensitivity and accuracy of measurement is required. It is intended that further precautions for the elimination of inaccuracies resulting from variable conditions shall be employed in conjunction with the various devices of the instant invention, for example, an insulated and pressure sealed casing having means for automatically establishing within the casing an approximately constant temperature and pressure. Sealing of the casing against pressure change not only avoids variation in the downward pull exerted by the mass as the result of barometric change, but prevents flow of air into and out of the casing as the indirect effect of barometric change, with resultant temperature variation. Such controls as require manipulation during operations in the field are arranged for accessibility externally of the casing. Magnetic shielding of the casing for use in gravitational work is contemplated.

In Figure 6 is illustrated a further arrangement whereby temperature compensation may be accurately controlled, it being assumed that rough compensation has first been effected by a proper selection of spring and support materials. The device in question is represented as applied to that portion of the structure shown in Figure 1 which serves to mount the mass supporting spring on the fixed part of the casing, and similar reference numerals are applied to elements which correspond to those previously described in connection with Figure 1. Thus it will be observed that the only change is the substitution for each of the several supporting and spacing rods 30, extending between the discs 26 and 28 of Figure 1, of a rod indicated generally at 160 and comprising an upper section 161 and a lower section 162, these sections being formed of materials having different coefficients of expansion. For example, one of the sections may be formed of aluminum and the other of invar. Rigid with the two sections of the rod is a nut 163 by means of which the rod may be rotated, and the respective sections of the rod are threaded for reception in bushings 165 and 166, the latter being in turn threaded within apertures in the discs 28 and 26 respectively.

It will be appreciated that a very wide range of compensation for temperature expansion may be effected by this arrangement, since the rod 160 may be threaded entirely within one or the other of the bushings so that the effective length of the rod may be constituted entirely by one or the other of the selected metals. The ratio of the selected metals in the effective length of the rod may be varied as desired between these extremes so that on the occurrence of temperature change any desired displacement of the disc 28 in a vertical direction will result, with consequent variation in the normal position of the supporting spring 16 and the mass which is carried thereby.

It will be appreciated that the foregoing device may be employed with or without other devices for effecting temperature compensation, for example the device illustrated in Figure 3 of the drawings.

In Figure 7 is illustrated a modification of the arrangement shown in Figure 3 for introducing automatic temperature compensation in the support for the spring 16 and the movable mass 15. Thus the arrangement disclosed in Figure 7 comprises a bi-metallic cantilever element 172 which may be secured at 173 to a fixed support 174, the upper end of the spring 16 being secured to the free end of the bi-metallic element. Slidable on the fixed support 174 is a block 175, the block bridging the gap between the bi-metallic element 172 and the support 174. One or more bolts 177 extend through slots 178 in the bi-metallic element 172 and through similar slots in the support 174, whereby the block 175 may be displaced longitudinally of the element and support and may be clamped in any desired position by means of the bolts 177. Longitudinal displacement of the block 175 may be effected by a threaded rod 179 which is mounted in the support 174 against longitudinal displacement and has threaded engagement with the block 175.

By rotation of the threaded rod 179, the block 175 may be so positioned as to leave any portion of the length of the bi-metallic element 172 free for flexure in response to temperature change, and thus the extent of compensation on the occurrence of such temperature change may be accurately predetermined.

Having thus described the invention, what is claimed as new and desired to be secured by Letters Patent is:

1. In apparatus for measuring displacement of a movably supported mass in response to gravity, the extent of such displacement being affected by temperature variation, the combination with a first condenser, the capacity of which is variable in response to displacement of said mass, of a second condenser of which the capacity is affected neither by gravity nor by temperature variation, a third condenser of which the capacity is unaffected by gravity but variable in response to temperature change, an electrical circuit of which the output is a measure of the capacity of a condenser included therein, and means for selectively including, as the condenser in said circuit, any one of the said condensers.

2. In apparatus for measuring displacement of a movable member in response to a force, the extent of such displacement being affected by temperature variation, the combination with a variable impedance device, said device being associated with said member and variable in response to displacement of the latter, of a second impedance device affected neither by said force nor by temperature variation, a third impedance device unaffected by said force but affected by temperature variation, an electrical circuit in which said impedances may be included in such manner that the output of the circuit is a measure of the value of the impedance, and means for selectively including any one of said impedances in said circuit.

3. A method of determining the effect of temperature variation on measurements of displacement of a movable member in response to a force, the measurements being taken by employing said member as an element of a variable impedance device in an electrical circuit, which method includes the steps of substituting for said impedance device other impedance devices of which a second device is affected neither by said force nor by temperature variation, and a third device is unaffected by said force but affected by temperature variation, and deriving from said circuit readings representative of impedance value at a plurality of temperatures with the use of each of said impedance devices, whereby the extent of displacement which is attributable to temperature change may be computed and eliminated.

4. A method of determining the effect of temperature variation on measurements of displacement of a yieldingly supported mass in response to gravity, the measurements being taken by employing the displacement of the mass to vary the capacity of a condenser in an electrical circuit, which method includes the steps of substituting for said condenser and the actuating mass other condensers of which the capacity of a second condenser is altered neither by gravity nor by temperature variation, and the capacity of a third condenser is unaltered by gravity but is altered by temperature variation, and deriving from said circuit readings representative of the capacity of each of the condensers at each of a plurality of temperatures, whereby the extent of displacement of said mass which is attributable to temperature change may be computed and eliminated.

5. A method of determining the effect of temperature variation on measurements of displacement of a yieldingly supported mass in response to gravity, the measurements being taken by employing the displacement of the mass to vary the capacity of a condenser in an electrical circuit employing a thermionic valve, which method includes the steps of substituting for said condenser and the actuating mass other condensers of which the capacity of a second condenser is altered neither by gravity nor by temperature variation, and the capacity of a third condenser is unaltered by gravity but is altered by temperature variation, and deriving from said circuit readings representative of the capacity of each of the condensers at each of a plurality of temperatures, whereby the extent of displacement of said mass which is attributable to temperature change may be computed and eliminated, and adjusting the cathode temperature of said valve to give the same reading for each of said plurality of temperatures with the said second condenser substituted in the circuit.

6. In a gravity meter, the combination with a vertically sprung mass and means for measuring vertical displacement thereof in response to gravity, of means for determining the sensitivity of said meter, said last named means including a spring adapted to normally support a small weight above said mass, and means for flexing said spring to deposit said weight on said mass, whereby the displacement of said mass due to the action of gravity on said weight may be determined.

7. In a gravity meter, the combination with a mass, of yielding means supporting said mass for gravitational displacement, means for measuring displacement of said mass, thermally responsive means supporting said yielding means and acting to compensate for displacement of said mass in response to temperature variation, said last named means including at least one elongated element disposed in the direction of the length of said yielding means, said element having separate portions of the length thereof formed of materials of different coefficients of expansion, and means for adjusting said element to include different relative lengths of said portions in the effective length of said element.

8. In a gravity meter, the combination with a mass, of yielding means supporting said mass for gravitational displacement, means for measuring displacement of said mass, a rod supporting said spring and disposed in the direction of the length of the latter, said rod having end sections formed of materials of different coefficients of expansion, said end sections having threaded connections of similar hand to said spring and to a fixed support, whereby rotation of said rod serves to vary the relative length of the end sections included in the effective length thereof to alter the degree of compensation offered by said rod to variation in temperature.

9. In a gravity meter, the combination with a mass, of spring means suspending said mass and sustaining the major portion of the weight thereof, means for measuring vertical displacement of said mass, means for preventing undamped lateral oscillation of said mass comprising a spring diaphragm connected centrally to said mass, the periphery of said diaphragm being held in fixed position, an auxiliary relatively light suspension spring mounted coaxially with said spring means, and adjustable means for regulating the tension on said auxiliary spring and thereby the initial position of said mass.

10. In a gravity meter, the combination with a vertically sprung mass and means for measuring the vertical displacement thereof in response to gravity, of means for determining the sensitivity of said meter, said last named means including a lever supporting a small weight above the mass, said weight being formed of a small diameter wire bent so as to provide a support hook portion in the vertical plane and a curved base portion in the horizontal plane, and a leaf spring mounted above said weight so as to hold the weight tightly against the lever in the elevated position of the weight, and a member operable exteriorly of the meter for moving said lever and depositing the weight on the mass, whereby the displacement of said mass due to the action of gravity on said weight may be determined.

OLIVE S. PETTY.